Dec. 8, 1931.  F. J. RODE  1,835,899
WELDING ROD
Filed June 27, 1924
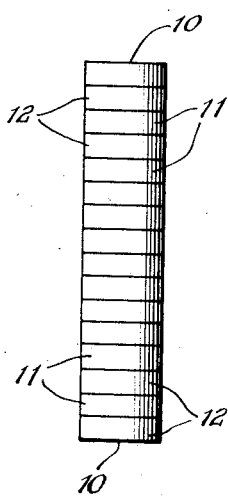
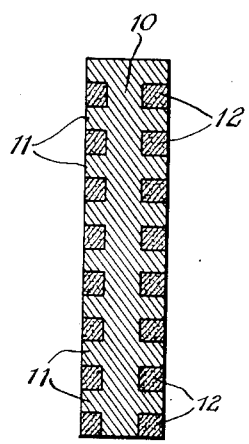
Inventor:
Fredrich J. Rode Patented Dec. 8, 1931

1,835,899

UNITED STATES PATENT OFFICE

FREDRICH J. RODE, OF CHICAGO, ILLINOIS, ASSIGNOR, BY MESNE ASSIGNMENTS, TO KORO CORPORATION, OF WAUKEGAN, ILLINOIS, A CORPORATION OF ILLINOIS

WELDING ROD

Application filed June 27, 1924. Serial No. 722,845.

This invention relates to improvements in rods for use in welding or brazing and particularly to that type of electrode which is fused by applied heat, the molten metal of the electrode being deposited upon and united with the parts to be welded.

Heretofore welding rods have been constructed of a metallic core in the form of a rod, the rod being shaped with annular grooves, the whole being completely covered with a covering surrounding the rod, the covering being held in place by entering the grooves.

This covering is constructed of a material which will be charred by the flame of the electric arc and will fall away in particles following the fusing of the rod.

With this form of electrode the electrical connection is made at one end of the electrode and the electrode is not so easily guided or manipulated in its action.

It is one of the objects of the present invention to provide an improved electrode of this type for welding in which the covering around the electrode is arranged at spaced intervals and alternately arranged with exposed portions or rings of the rod or electrode thereby rendering it possible to transmit current to the electrode at various points throughout the length of the electrode, the covering being charred or burned away by the flame so that it will fall away in particles as the rod is fused or consumed.

To the attainment of these ends and the accomplishment of other new and useful objects, the invention consists in the features of novelty in the construction, combination and arrangement of the several parts hereinafter more fully described and claimed and as shown in the accompanying drawings illustrating the invention and in which drawings:

Figure 1 is a side elevation of an improved electrode of this character constructed in accordance with the principles of this invention.

Figure 2 is a vertical longitudinal sectional view of Figure 1.

Referring more particularly to the drawings the numeral 10, designates a metal rod or core shaped to form spaced rings throughout its length. The rings 11, co-operate to form intermediate spaces and in which spaces is arranged a protective shell or covering 12, so as to form alternately arranged rings of metal and the protective shell or covering.

The covering or shell is constructed of any suitable material, which will burn or char under the flame of the arc and will crumble or fall away in particles as the rod or electrode fuses or is consumed.

The periphery of the electrode and of the rings of the protective shell or covering is continuous and the peripheries of the rings on the rod will at all times be exposed so that it is possible to connect or transmit the current to the electrode at various points throughout the length of the electrode.

As the rod 10, is consumed the casing or shell will also be destroyed and the flame of the arc will be directed around the end of the electrode by the shell or casing 12.

The rings 11, may be formed in any suitable manner either integrally with the rod 10, or separately therefrom and placed upon the rod, and the spaces between adjacent rings in which the shell or covering is arranged may be of any desired or suitable depth and width.

Obviously many changes may be made in the details of construction and in the combination and arrangement of the several parts within the scope of the claims without departing from the spirit of this invention, and while the electrode is described for use in electric welding, it will be manifest that it may be used for other processes of welding, or for brazing, or for electrodes wherein the flux is carried by the electrode.

What is claimed as new is:

1. A rod for use in electric welding comprising a rod having a centrally disposed solid core of substantial diameter extending throughout the length of the rod, a series of substantially parallel annular recesses encompassing the core and opening through the periphery of the rod, said recesses being spaced from each other in directions lengthwise of the rod, and fluxing material substantially filling the recess to form complete rings about the core and disconnected from each other, the peripheral surface of the rod between said rings being bare.

2. A rod for use in electric welding comprising a rod having a centrally disposed solid core of substantial diameter extending throughout the length of the rod, a series of substantially parallel annular recesses encompassing the core and opening through the periphery of the rod, said recesses being spaced from each other in directions lengthwise of the rod, and fluxing material substantially filling the recess to form complete rings about the core and disconnected from each other, the peripheral surface of the rod between said rings being bare, whereby a shielded arc will be produced, and for causing the rod to burn towards the axis of the rod to form a cavity at the center of the rod to localize the arc.

In testimony whereof I have signed my name to this specification, on this 25th day of June, A. D. 1924.

FREDRICH J. RODE.